T. D. BURRALL.
Corn Sheller.
No. 2,083.
Reissued Oct. 10, 1865.
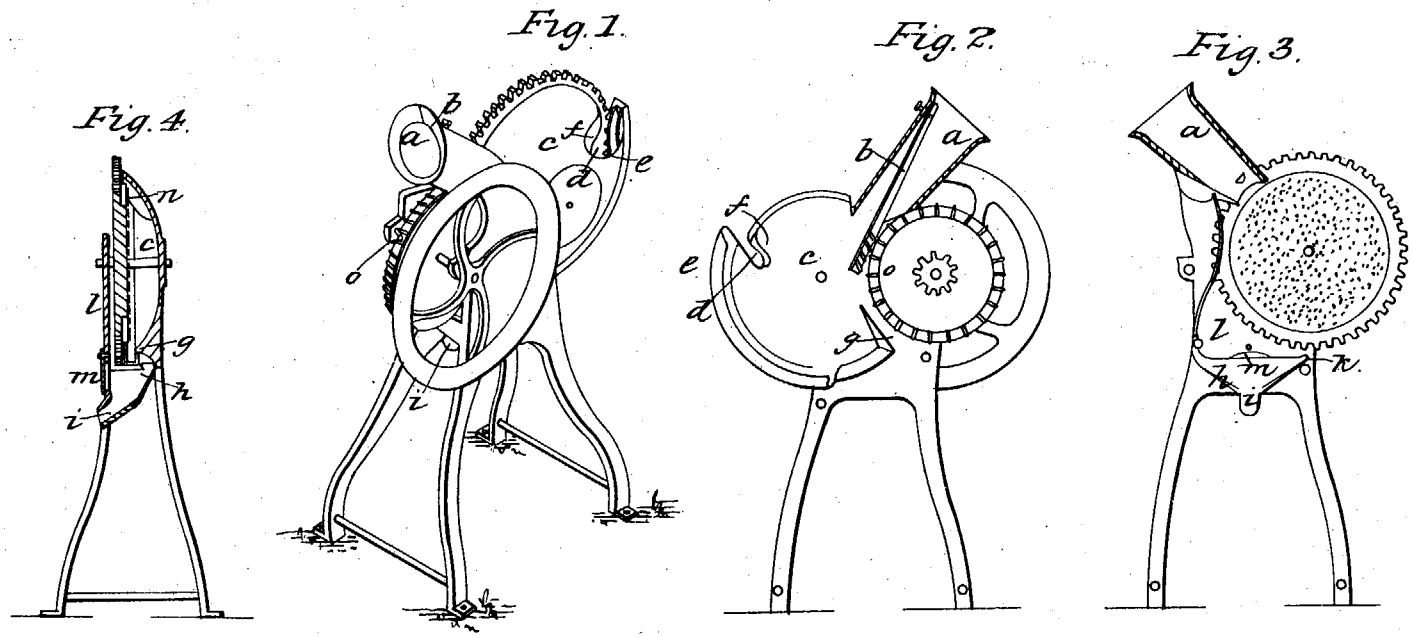
N. PETERS, Photo-Lithographer, Washington, D. C.

UNITED STATES PATENT OFFICE.

THOMAS D. BURRALL, OF GENEVA, NEW YORK.

IMPROVEMENT IN CORN-SHELLERS.

Specification forming part of Letters Patent No. 4,300, dated December 6, 1845; extended 7 years; Reissue No. 2,083, dated October 10, 1865.

*To all whom it may concern:*

Be it known that I, THOMAS D. BURRALL, of the village of Geneva, in the county of Ontario and State of New York, have invented new and useful Improvements in the Machine for Shelling Corn; and I do hereby declare that the following is a full and exact description thereof, reference being had to the accompanying drawings, and to the letters of reference marked thereon.

The nature of my improvements consists in adding other parts of the machine than are used in those now in use, so as to separate the shelled corn from the cob, discharge the shelled corn and the cob from the machine separately, and to prevent the scattering of the corn in shelling.

To enable others skilled in the art to make and use my invention, I will proceed to describe the construction and operation thereof.

The corn-sheller in use previous to my invention consisted generally of a suitable frame of wood or iron, on which was placed, on a horizontal shaft turned by a crank, a circular face-plate or wheel of iron of about sixteen inches in diameter, more or less. This face-plate had cast upon it pointed teeth of pyramidal projections of about half an inch (more or less) in length. This formed the sheller. Upon the outer edge or rim of this wheel were teeth meshing into and driving a small pinion on another shaft, on which was placed, at a suitable distance from the face of the sheller, another wheel of about eight inches diameter, having a bevel-face inclining to the sheller, across which was raised small oblique ribs or projecting lines, which served as feeders to the sheller, and at the same time gave a rotary motion to the ear of corn as it passed through a spout or hopper from above, and so as thus to present every part of the surface of the ear to the sheller. Within or over the hopper was placed a wood or metal spring, so arranged as that the lower end of it pressed the ear of corn into the corner or angle formed by the sheller and feeder (as they revolve in opposite directions) with sufficient force to enable the teeth upon the sheller to detach or shell the corn from the cob while the ear was passing over the feeder. The corn and cob then fell together in a common heap, and were afterward separated. In most of the machines in use a fly-wheel was placed upon the feeder-shaft, so as to give a more equable motion to the sheller.

In making my machine I adopted the several parts substantially as above described, except that I made the hopper cylindrical instead of square or angular, as shown in the drawings at *a*, so as to conform the shape thereof to that of the ear of corn which it was intended to receive. To the inner side of this hopper I attach a steel spring, *b*, screwed thereto by a screw-bolt at the upper end, somewhat flattened and enlarged at the lower end, so as to press the ear of corn against the sheller as it passes into the angle formed by the sheller and feeder. When in motion the pressure of the spring is governed by a set-screw near the upper end. But in order to separate the shelled corn from the cob and to discharge the one entirely separate from the other I attached to the side of the machine facing the sheller a section of a circular cast-iron concave plate or disk, *c*, of the same diameter as the sheller, extending from the lower part of the feeder forward and upward until it connects with the hopper The edge of this plate or disk is about a half an inch from the ends of the outer row of teeth, so as to allow the corn, but not the cob, to pass between freely, while at the center the space between this plate or disk and the ends of the teeth upon the sheller is about two and a half to three inches, or sufficient to allow the cob to be passed between them. On the outer edge of this plate or disk is an opening, *d*, about one and a half or two inches in diameter, or sufficiently large to allow the cob to pass through easily, with its lower lip, *e*, curved outward to assist in giving to the cob as discharged a falling motion, and its upper lip *f*, curved inward, so as very nearly to touch the teeth of the sheller, and thus to intercept the cob and guide it into and out through this opening. This opening is in the side of the plate or disk opposite to the feeder, and about upon a level with the axis of the sheller. Attached to the outer edges of this plate or disk is a cast-iron curved spout, *g*, about an inch and a half wide and one and a half to two inches deep, extending downward from the opening above described under the bottom of the plate or disk and sheller. Connecting therewith is a cast-iron shell or bottom, *h*, extending across the machine, and forming a continuation of the spout to an opening, *i*, below on one side of the frame, through which the shelled corn passes out. The front edge of this shell or bottom is extended up a short distance, as at *k*, so as to reach near the lower edge of the sheller to prevent shelled corn from flying out on that side. From the opposite end of this shell or bottom another plate, *l*, is extended across the machine upward to the hopper, so as to inclose all the back of the machine, leaving only space for the feeder and pinion, in order to keep the shelled corn from flying out behind. The sides of the frame are also inclosed as far down as the shell or bottom above described, so as entirely to inclose the working parts of the machine. On one of these sides, and immediately above the lower termination of the spout, is a small door, *n*, turning on a rivet or pin, for cleaning out broken pieces of cobs or any other obstructions which may get into the machine.

In making my machine I form one half the hopper in the same piece with the side of the frame, and the other half of the hopper, and also the concave plate or disk described, with the other half of the frame, thus simplifying and strengthening the whole and economizing in the manufacture thereof.

The way in which my machine works is as follows: The ear of corn is placed in the cylindrical hopper; the spring presses it against the feeder, which carries it to the sheller. In passing through the working-point between the feeder *o* and the sheller *n* the shelled corn and cob fall together between the lower part of the sheller *n* and the plate or disk. Here the cob is again caught and carried forward and upward by the teeth upon the sheller until it reaches the circular opening in the plate or disk before described, and it is here guided by the under lip, *e*, of the said opening *d* upward, and is then discharged through said opening upon that side of the machine, while the shelled corn falls through the space between the plate or disk and the sheller into the spout below, and passes through the opening on the other side, thus making a perfect and entire separation of the shelled corn from the cob without loss or trouble. The advantage of this is obvious, since in the mode in use before the invention of my improvements it required nearly as much labor after the corn was shelled to separate the grain from the cob, gather up the shelled corn, which was thrown in all directions, and fit it for market as was required to shell it, whereas by the use of my improvements none of the shelled corn is scattered or mixed with any foreign substance, nor does it require any additional cleaning to fit it for use.

Having thus described my improvements, what I claim as my invention, and wish to secure by Letters Patent, is—

1. The opening *d*, in combination with the plate or disk *c* and the sheller, substantially as and for the purpose described.

2. The open space between the lower edge of the sheller and the plate or disk *c*, in combination with said plate or disk and the sheller, substantially as and for the purpose described.

THOMAS D. BURRALL.

Witnesses:

GEORGE N. DOX,

WM. L. BALDWIN.